United States Patent
Aida et al.

(10) Patent No.: US 7,421,425 B2
(45) Date of Patent: Sep. 2, 2008

(54) INFORMATION PROVIDING METHOD AND INFORMATION PROVIDING SYSTEM

(75) Inventors: Kiyoshi Aida, Tokyo (JP); Tomohiko Shirahama, Tokyo (JP)

(73) Assignee: Sony Corporation, Tokyo (JP)

( * ) Notice: Subject to any disclaimer, the term of this patent is extended or adjusted under 35 U.S.C. 154(b) by 426 days.

(21) Appl. No.: 10/822,071

(22) Filed: Apr. 8, 2004

(65) Prior Publication Data

US 2004/0193443 A1    Sep. 30, 2004

Related U.S. Application Data

(63) Continuation of application No. 09/845,136, filed on Apr. 30, 2001, now abandoned.

(30) Foreign Application Priority Data

May 1, 2000   (JP)   ............................... 2000-132713

(51) Int. Cl.
*G06F 17/30* (2006.01)
(52) U.S. Cl. ........................................... 707/3; 707/10
(58) Field of Classification Search ..................... 707/3, 707/10
See application file for complete search history.

(56) References Cited

U.S. PATENT DOCUMENTS

| | | | | |
|---|---|---|---|---|
| 5,751,672 | A * | 5/1998 | Yankowski | .................. 709/238 |
| 5,893,091 | A * | 4/1999 | Hunt et al. | ..................... 707/3 |
| 5,991,758 | A * | 11/1999 | Ellard | ........................... 707/6 |
| 6,230,192 | B1 | 5/2001 | Roberts et al. | |
| 6,288,991 | B1 | 9/2001 | Kajiyama et al. | |
| 6,505,160 | B1 * | 1/2003 | Levy et al. | ................... 704/270 |
| 6,587,127 | B1 | 7/2003 | Leeke et al. | |
| 6,785,671 | B1 * | 8/2004 | Bailey et al. | .................... 707/3 |

* cited by examiner

*Primary Examiner*—Joon H Hwang
(74) *Attorney, Agent, or Firm*—Frommer, Lawrence & Haug LLP; William S. Frommer; Paul A. Levy

(57) ABSTRACT

Data relating to a predetermined media are formed as a database which can be retrieved by key data generated based on information of a predetermined area of such media. When a predetermined media is inserted into an apparatus, data relating to corresponding media within the database is retrieved and the retrieved data can be obtained. Therefore, information relating to package media such as a CD can be provided with ease.

12 Claims, 7 Drawing Sheets

| Play List | | | | | | |
|---|---|---|---|---|---|---|
| Get CD Information | Package | abc | | Time | 00:49:29 | |
| | Artist | ABCDEF | | Type | CD Audio | |
| | Memo | | | | | |
| Contents | | | | | | |
| No. | | Format | Time | | Memo | |
| 1 | AAABB | CD Audio | 00:04:08 | | | |
| 2 | BBBBC | CD Audio o | 00:03:25 | | | |
| 3 | CCCCC | CD Audio o | 00:03:48 | | | |
| 4 | DDDDD | CD Audio o | 00:04:39 | | | |
| 5 | E | CD Audio o | 00:04:33 | | | |
| 6 | F | CD Audio o | 00:04:04 | | | |
| 7 | G | CD Audio o | 00:05:12 | | | |
| 8 | H | CD Audio o | 00:04:45 | | | |
| 9 | I | CD Audio o | 00:03:47 | | | |
| 10 | J | CD Audio o | 00:05:22 | | | |
| 11 | K | CD Audio o | 00:05:40 | | | |

![Screenshot of CDNOW-JAPAN Artist Discography browser window showing albums by ABCDE: abc (Release Date: 01/19/2000, ¥1223), def (Release Date: 10/27/1999, ¥1020), ghi (Release Date: 08/11/1999, ¥1020), jkl (Release Date: 07/01/1999, ¥3059), each with a BUY CD button]

FIG. 9

INFORMATION PROVIDING METHOD AND INFORMATION PROVIDING SYSTEM

CROSS REFERENCE TO RELATED APPLICATIONS

This application is a continuation of application Ser. No. 09/845,136, filed Apr. 30, 2001, now abandoned.

BACKGROUND OF THE INVENTION

The present invention relates to an information providing method and an information providing system suitable for use in a method and system for providing information relating to package media such as a compact disc (CD).

When individual users are going to get necessary information from the Internet by using information equipment such as a computer apparatus, users have heretofore been required to get an address of a corresponding homepage by any method and to connect the information equipment to the obtained homepage address in a manual fashion.

However, when users intend to connect the information equipment to the homepage address, there arises a problem that it takes a lot of time for users to enter the homepage address. Moreover, when users cannot search a corresponding homepage address, there also arises a problem that users are unable to get necessary information.

When user who had bought package media such as a CD are going to get information relating to music recorded on the package media, if a homepage address is printed on a suitable material such as a package in which the package media is stored and an explanatory note, then users are able to enter the corresponding homepage address. In this case, however, it takes plenty of time to enter the homepage address. If a homepage address should not be printed on the suitable material, user would have to search the corresponding homepage address by other method, and hence it takes a lot of time to get information.

SUMMARY OF THE INVENTION

In view of the aforesaid aspect, it is an object of the present invention to provide an information providing method and an information providing system in which information relating to package media such as a CD can be provided with ease.

According to an aspect of the present invention, there is provided an information providing apparatus including a database in which information relating to a predetermined media can be searched by key data generated based on information at a predetermined place of the media.

According to another aspect of the present invention, there is provided an information acquiring apparatus which is comprised of means for acquiring information relating to a predetermined media by transmitting key data generated based on information at a predetermined place of a predetermined media and by receiving results obtained when an external apparatus has searched the key data based on transmitted data.

According to a further aspect of the present invention, there is provided an information providing method which is comprised of the step of paying a predetermined charge to a media contents owner from a database owner having a database in which information relating to a predetermined media can be searched by key data based on information at a predetermined place of the media when a user of the database uses the database.

According to a further aspect of the present invention, there is provided an information providing method which is comprised of the step of searching information relating to a predetermined media of a database by key data generated based on information at a predetermined place of the media.

According to a further aspect of the present invention, there is provided an information acquiring method which is comprised of the step of acquiring information relating to a predetermined media by transmitting key data generated based on information at a predetermined place of the media to the outside and by receiving results obtained when an external apparatus has searched the key data based on transmitted data.

In accordance with yet a further aspect of the present invention, there is provided a program which is comprised of the step of searching information relating to a predetermined media of a database by key data generated based on information at a predetermined place of the media.

In accordance with still a further aspect of the present invention, there is provided a program which is comprised of the step of acquiring information relating to a predetermined media by transmitting key data generated based on information at a predetermined place of the predetermined media and by receiving results obtained when an external apparatus has searched the key data based on transmitted data.

DESCRIPTION OF THE PREFERRED EMBODIMENT

An information providing method and an information providing system according to an embodiment of the present invention will be described below with reference to the accompanying drawings.

Figure 1:
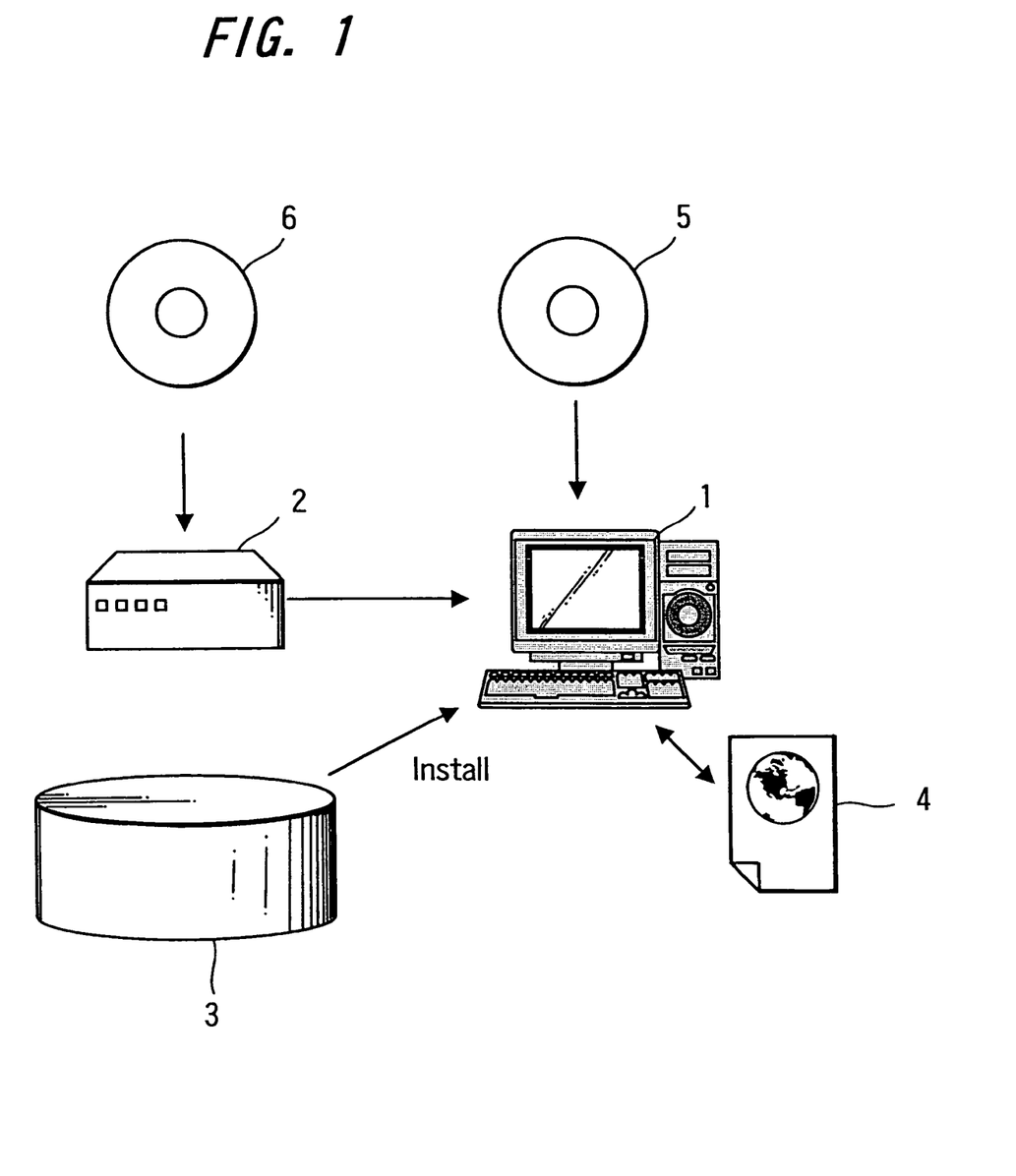
FIG. 1 is an explanatory diagram showing a system configuration according to an embodiment of the present invention.

FIG. 1 is an explanatory diagram showing a system configuration according to an embodiment of the present invention.

In this embodiment, the system configuration is such one which is adapted to get information relating to music CD which is the package media in which digital audio data and the like are recorded. FIG. 1 is a block diagram showing an arrangement of an apparatus which is installed on the user side. As the above apparatus, there is prepared a computer apparatus 1 which incorporates therein a CD-ROM (CD-read-only memory) drive. Moreover, there may be used a CD changer 2 which can store therein a large number of music CDs (e.g., several 10s of to several 100s of music CDs). This CD changer 2 may be connected to the computer apparatus 1 through a suitable interface means.

The computer apparatus 1 incorporates therein a mass-storage capacity data memory means which is called a hard disk drive (HDD) and is able to store various kinds of application programs and data by using the hard disk drive. Here, CD data and application program 3 for database are stored in advance in the hard disk drive of the computer apparatus 1 in accordance with user's operations. The CD data and application program 3 may be in advance installed on the hard disk drive of the computer apparatus 1 when the computer apparatus 1 is sold (distributed). Moreover, the computer apparatus 1 can be connected to the Internet 4 through a communication means such as a telephone network line. Further, the computer apparatus 1 is connected with an input means such as a keyboard and a monitor for displaying images. If necessary, peripheral equipment such as a printer may be connected to the computer apparatus 1.

The CD database and application program 3 may be distributed to users as a data storage disk such as a CD-ROM, for example, or may be distributed to users through the Internet 4. The CD database thus distributed may be updated in contents at any time through the Internet 4. While information relating to the music CDs are stored in the CD database according to this embodiment, the retrieval of such information based on the application program is executed by using key data generated at each disc (CD), for example. This key data will be described later on.

When there is a music CD of which a user wants to get desired information relating to music stored in the disc, such a music CD 5 is loaded on the CD-ROM drive of the computer apparatus 1. A music CD 6 of desired information may be loaded on the CD changer 2.

Figure 2:
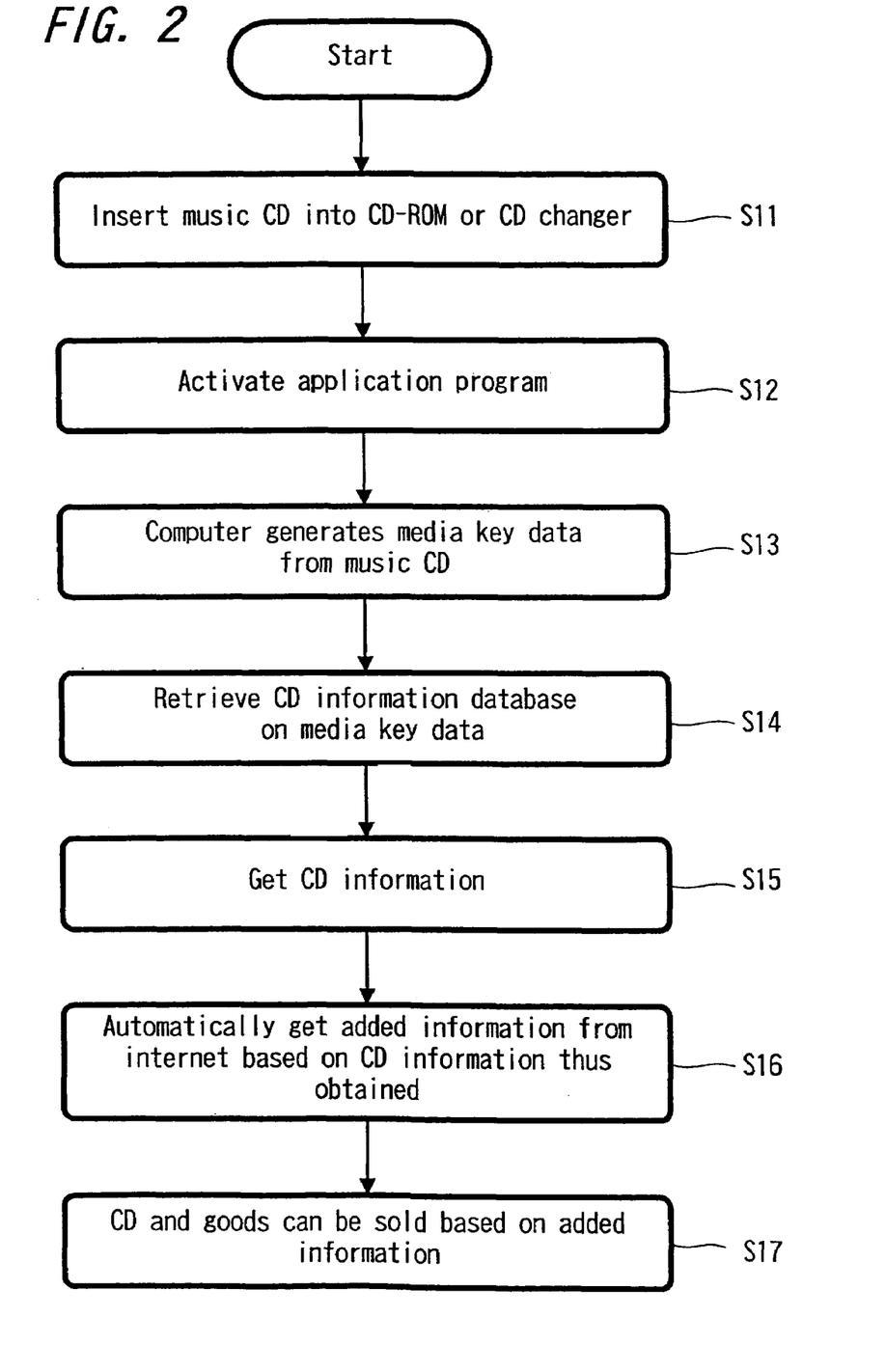
FIG. 2 is a flowchart to which reference will be made in explaining a flow of process for acquiring information according to the present invention.

FIG. 2 is a flowchart to which reference will be made in explaining the manner in which a music CD of desired information is obtained. The above processing will be described below with reference to the flowchart of FIG. 2.

Figure 3:
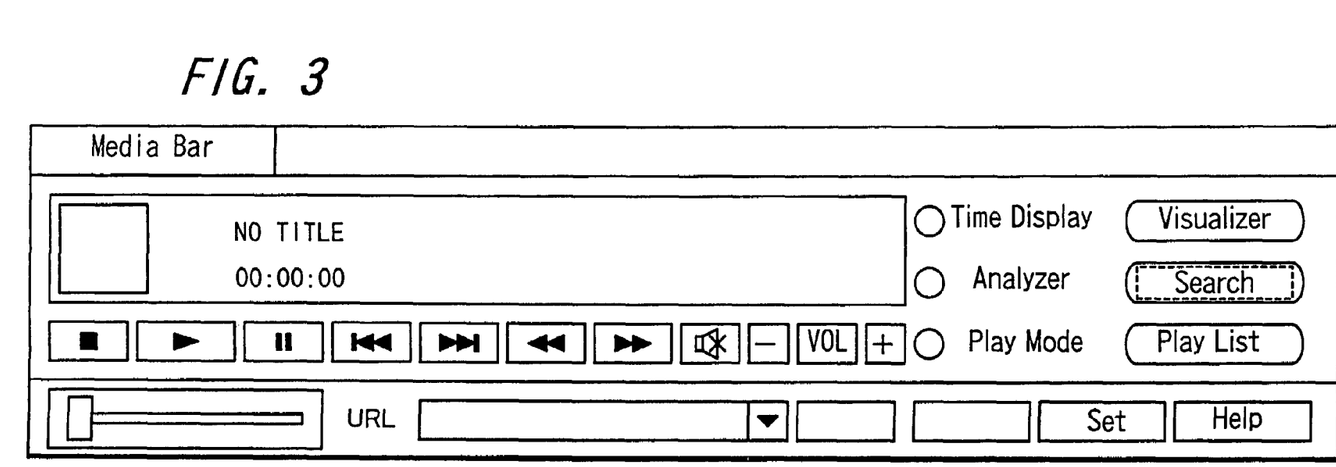
FIG. 3 is an explanatory diagram showing an example of a picture displayed on a screen of a computer and to which reference will be made in explaining operations of the present invention.

Referring to FIG. 2, and following the start of operation, the music CD 5 or 6 of desired information is loaded on the CD-ROM drive of the computer apparatus 1 or the CD changer 2 at step S11. If it is determined by a control section (not shown) within the computer apparatus 1 that the music CD 5 or 6 is loaded on the CD-ROM drive of the computer apparatus 1 or on the CD changer 2, then processing goes to a step S12, whereat the CD database application program 3 prepared in the hard disk of the computer apparatus 1 is activated. When this CD database application program 3 is activated, a picture shown in FIG. 3, for example, is displayed on the monitor of the computer apparatus 1. After this CD database application program 3 has been activated, it becomes possible to use the CD database.

Then, in this embodiment, at a step S13, key data which is data peculiar to the CD thus loaded is generated based on this CD database application program 3. This key data is what might be called a media key, for example.

An example of the manner in which this key data is generated will be described below. The music CD, for example, includes an index information recording area called a TOC (Table of Contents) in the data recording area of the innermost periphery thereof. Key data can be generated by a constant calculation processing using data recorded on the above area. To be concrete, information indicative of the number of tracks of a disc, information indicative of the total disc play time and information on play time of every track (music) are recorded on the TOC area of the music CD in accordance with a previously-determined format. When information indicative of the number of tracks of a disc, information indicative of the total disc play time and information indicative of the play time of 1 track to 5 tracks are calculated by a constant calculation equation, and calculated results are used as key data. Key data are generated by such calculation, whereby key data inherent in individual discs are generated. If discs of different kinds in which data in the TOC area are exactly the same should exist, the same key data would have been generated. However, such a case hardly occurs in actual practice. The above key data calculation processing has already been proposed by the same assignee of this application (see Japanese laid-open patent application No. 8-306170).

Figure 4:
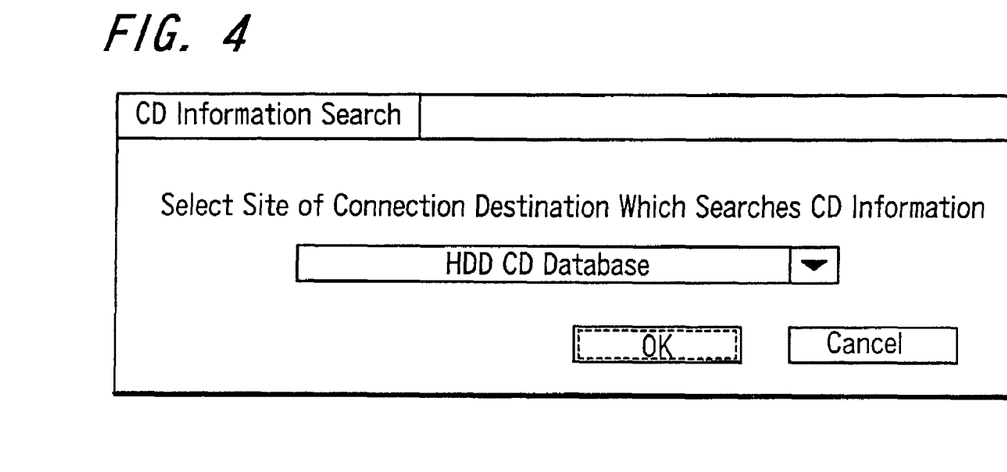
FIG. 4 is an explanatory diagram showing an example of a picture displayed on a screen of a computer and to which reference will be made in explaining operations of the present invention.

Referring back to the flowchart of FIG. 2, control goes to a step S14, whereat based on the generated key data serving as key words, CD database is retrieved in accordance with the application program 3 that has been activated within the computer apparatus 1 at the step S12. At that time, as shown in FIG. 4, for example, a picture which inquires the retrieval destination may be displayed on the monitor of the computer apparatus 1 so that database other than the CD database incorporated within the computer apparatus 1 may be executed.

Figure 5:
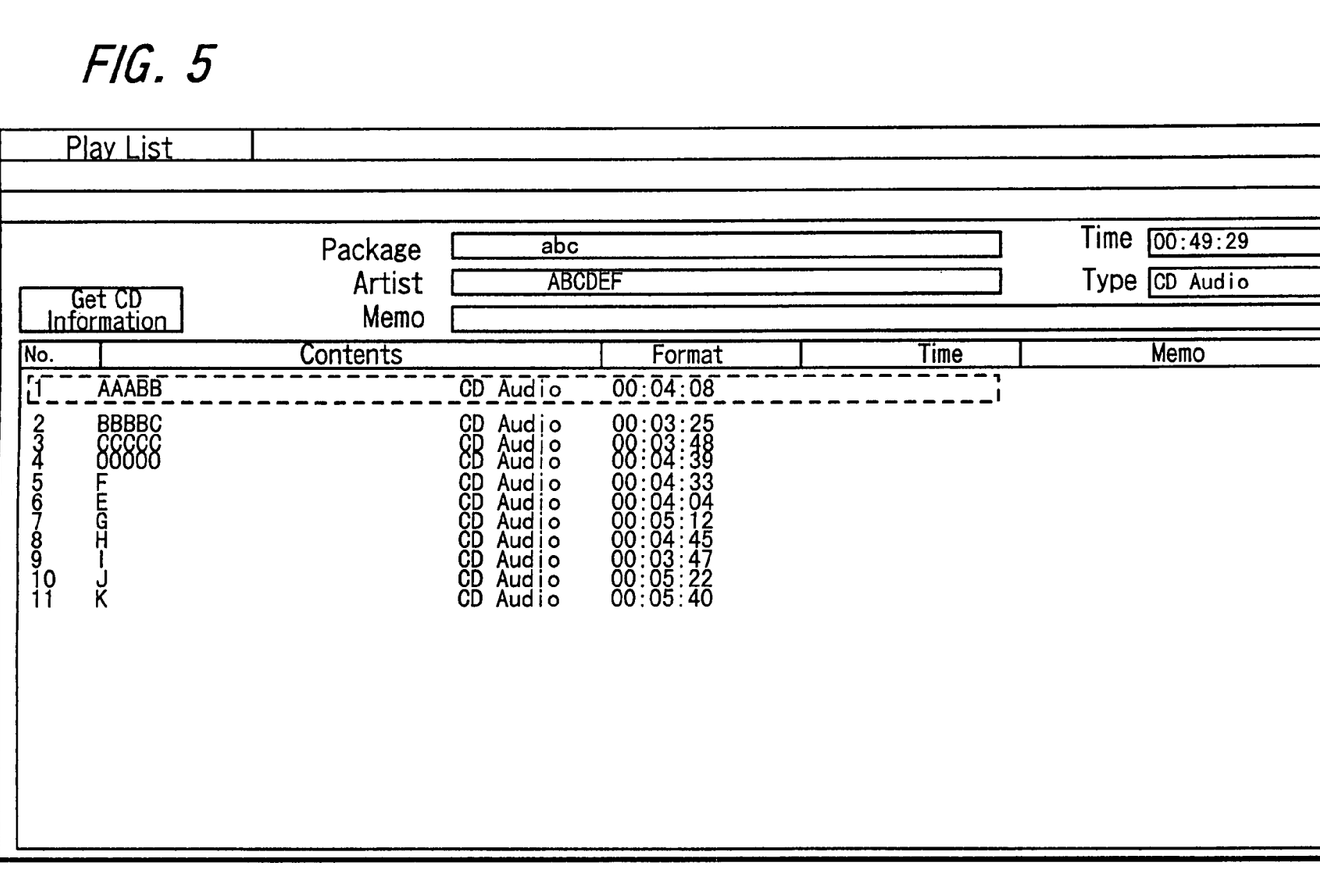
FIG. 5 is an explanatory diagram showing an example of a picture displayed on a screen of a computer and to which reference will be made in explaining operations of the present invention.

When information relating to the CD corresponding to the database is obtained by the retrieval at the step S14, such obtained information is displayed on the monitor of the computer apparatus 1 as shown in FIG. 5, for example. As information displayed on the monitor of the computer apparatus 1, there may be considered information such as a title name of the album recorded on the corresponding CD, a player name, a title of a piece of music (one track) and a play time of a piece of music (one track). Information such as a play time of each piece of music recorded on the TOC of the disc may be read out from the TOC of such a disk and may be registered on the database. Text data such as explanatory notes concerning players and recorded music and a title picture of album and the like may be registered on the database and displayed on the monitor of the computer apparatus 1.

Figure 6:
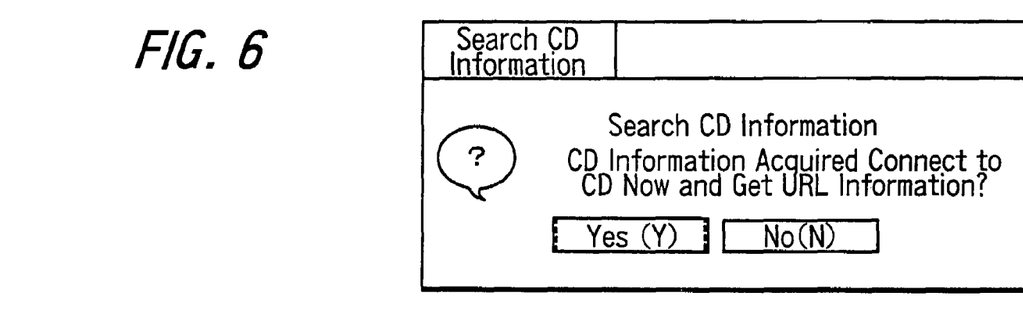
FIG. 6 is an explanatory diagram showing an example of a picture displayed on a screen of a computer and to which reference will be made in explaining operations of the present invention.

In the case of this embodiment, the homepage address relating to the music CD can be obtained by the retrieval at the step S14. Specifically, the homepage address concerning players of music CD, musical composers or organization (e.g., musical management office, etc.) to which players and the like are belonging, CD producing company or CD distributor is stored in the database prepared in the computer apparatus 1, whereby users can automatically access such homepage through the Internet (step S16). At that very time, a picture shown in FIG. 6, for example, is displayed on the monitor of the computer apparatus 1 to inquire of users about the execution of the access.

Figure 7:
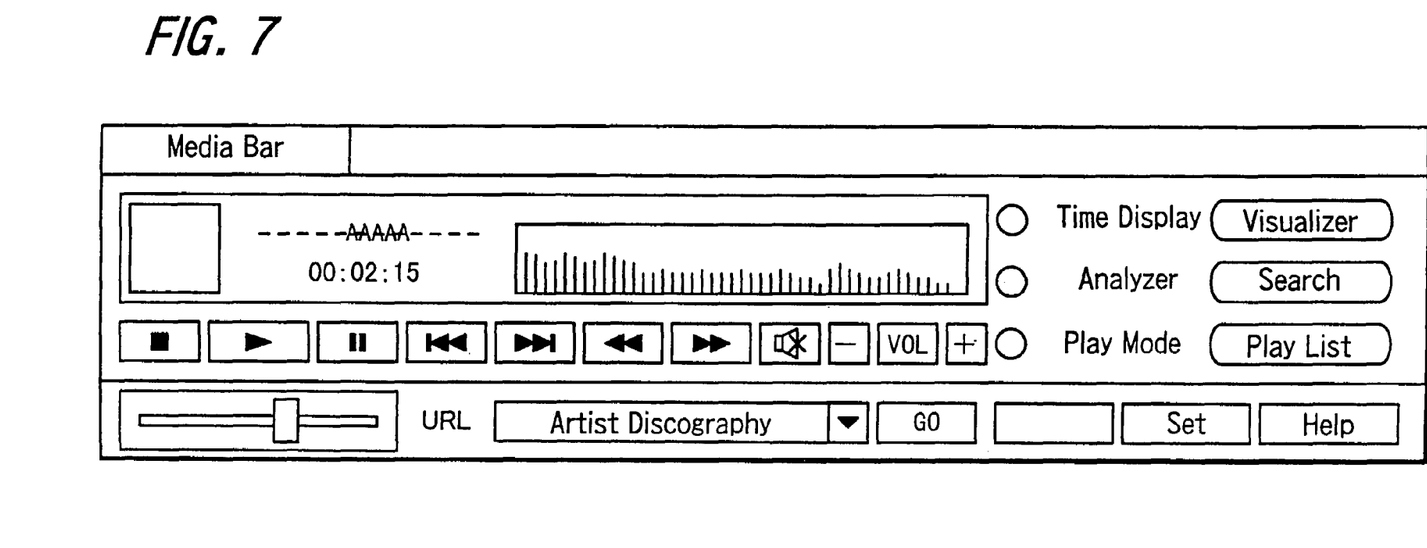
FIG. 7 is an explanatory diagram showing an example of a picture displayed on a screen of a computer and to which reference will be made in explaining operations of the present invention.
Figure 8:
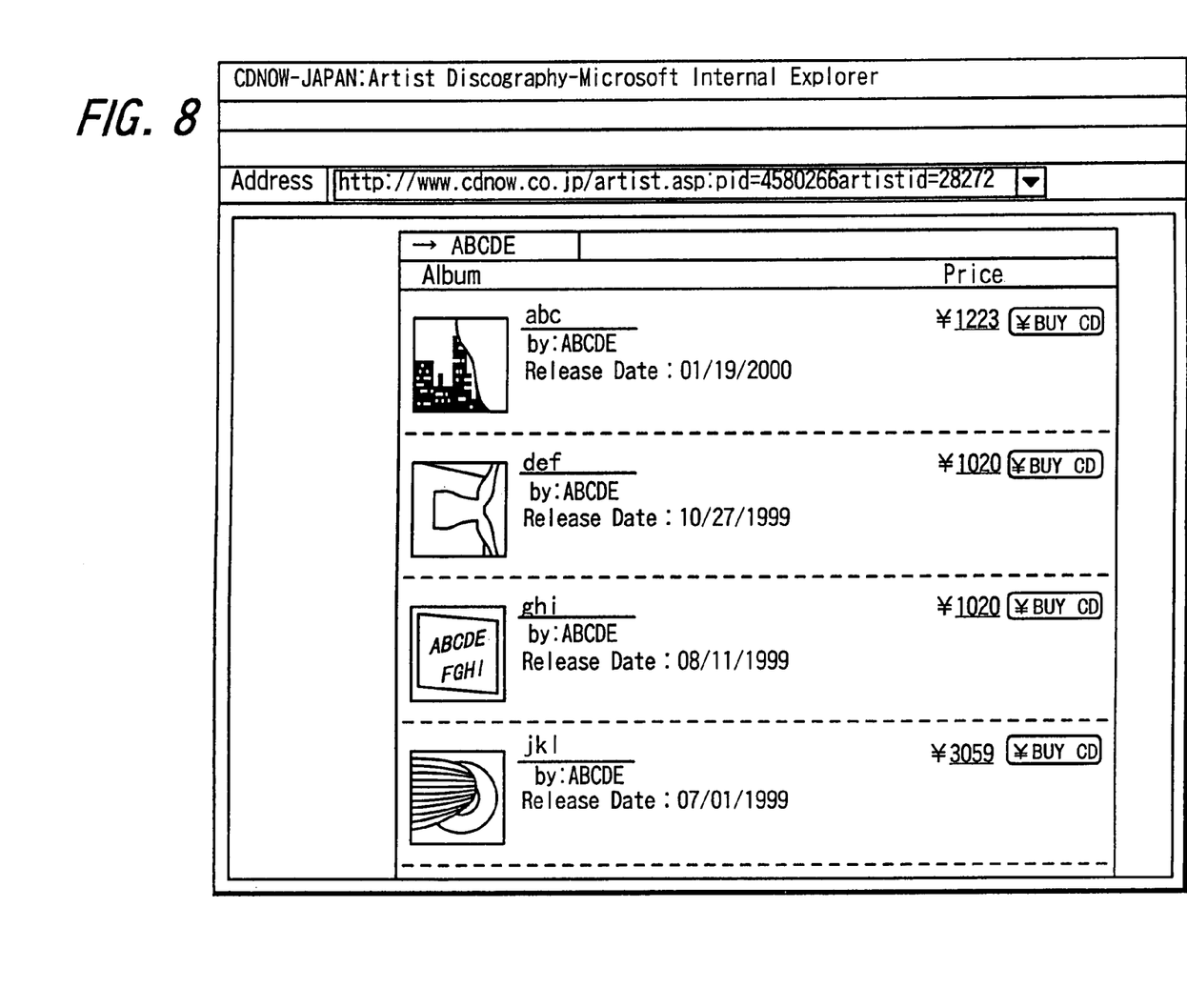
FIG. 8 is an explanatory diagram showing an example of a picture displayed on a screen of a computer and to which reference will be made in explaining operations of the present invention.

When corresponding information is obtained by the execution of the access at the step S16, control goes to a step S17, whereat a picture indicative of such corresponding information (picture shown in FIG. 7, for example) is displayed on the monitor of the computer apparatus 1, and a player,s CD list picture and the like shown in FIG. 8, for example, are displayed on the monitor of the computer apparatus 1.

When a CD list picture shown in FIG. 8 is displayed, a user can directly purchase the music CD or goods relating to the music CD from this homepage by a so-called Internet shopping. When a user purchases goods, a database provider may demand the payment for the homepage builder. However, when the homepage builder agrees with the CD seller (or distributor), such accounting becomes unnecessary.

Figure 9:
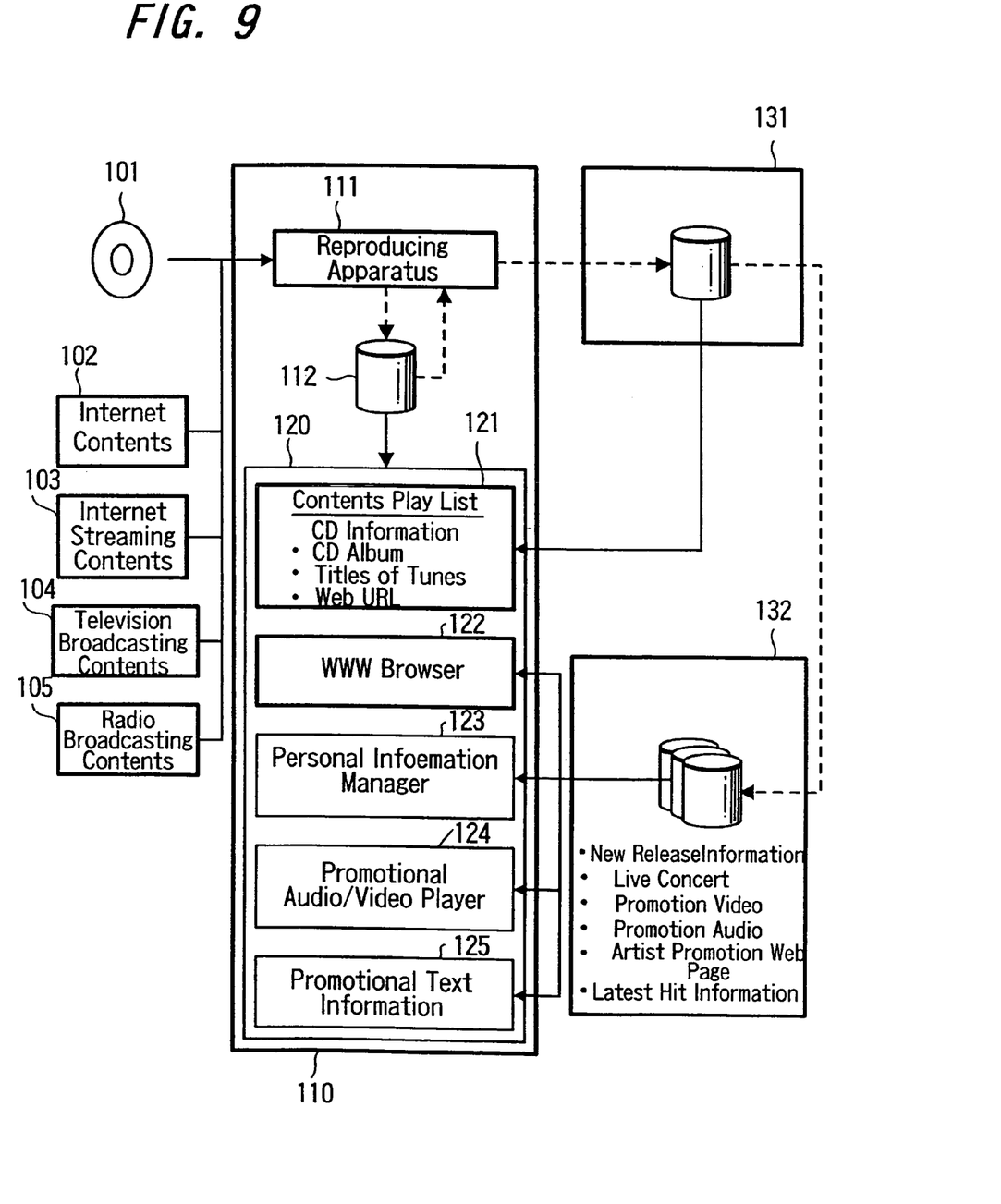
FIG. 9 is a block diagram showing a whole processing system according to an embodiment of the present invention.

FIG. 9 is a block diagram showing an arrangement of the whole system and to which reference will be made in explaining a relationship between a user (purchaser of CD), a CD seller and a homepage builder.

As shown in FIG. 9, a purchaser of a package media 101 such as a CD loads the package media 101 on a drive 111 within a computer apparatus 110 and executes the retrieval of a database 112 by using key data generated on the basis of the package media 101. Data which are directly related to contents stored in the media within the database 112 are provided from a server 131 on the media seller side.

Then, when an address of a relating web (homepage) is obtained by a calculation processing section 120 within the computer apparatus 110, various kinds of data can be obtained by connecting the computer apparatus 110 to a server 132 of a corresponding homepage by using a WWW browser 122 within the computer apparatus 110. For example, there may be obtained CD new release information, live concert information, player promotion video information or promotion audio information, artist promotion web page information, latest hit information, and the like.

These data are processed by a personal information manager 123, a promotional audio/video player 124 and a promotional text information 125 at every kind of data and thereby displayed and reproduced.

While the package media is the music CD as described above, the package media of the present invention is not limited thereto and may be a DVD (digital video disc or digital versatile disc) and other package media. Moreover, as shown in FIG. 9, for example, the package media may be media 102 based on contents obtained through the Internet, media 103 based on contents of streaming data such as video data and audio data obtained through the Internet, media 104 based on contents obtained from a television broadcasting and media 105 based on contents obtained from a radio broadcasting.

According to the present invention, it becomes possible to easily get necessary data by using key data generated based on predetermined data recorded on the media. For example, if a database is prepared on the hard disk of the computer apparatus, then it becomes possible to display information relating to data recorded on the media such as a CD without connecting the computer apparatus to the Internet. Moreover, since the homepage of the Internet is accessed based on the data thus obtained, more detailed information can be obtained and the display of information or the like becomes possible. Since this homepage can be accessed, other medias can be sold and the latest music information can be obtained with ease, When the information provider capable of providing information in response to the access from the media owner is different from the media seller or distributor, since the media seller or distributor demands the predetermined payment from the information provider in response to the access situation or usage situation between the media owner and the information provider, it becomes possible to correctly execute the accounting brought about by the supply of information provided through the media and such provision.

Having described a preferred embodiment of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An information acquiring apparatus comprising:
a memory storing a database, the database having updatable content containing information relating to a media, searchable by key data generated as a function of information stored at a predetermined place of said media, said content including an address of a server relating to the media;
means for reading the key data from the media;
means for accessing, through the Internet, the server based on the address of the server retrieved from the database, wherein the database is retrieved based on the key data;
means for obtaining from the server, through the Internet, an address of a website relating to the media, said website address being different than said server address;
means for inquiring of a user whether to execute accessing the website;
means for accessing, through the Internet, the website at the address of the website obtained from the server based on a result of the inquiry; and
means for updating said content of the database at any time through the Internet by connecting said database to said address of the website obtained from the server;
wherein a user selects a location of another database having said updatable content searchable by said key data, said another database being different from said database included in said information acquiring apparatus, wherein said another database is retrieved based on the key data.

2. The information acquiring apparatus according to claim 1, further comprising means for inquiring a user, before obtaining the address of the website, whether an access to the server is acceptable.

3. The information acquiring apparatus according to claim 1, wherein said key data is generated by calculating a portion of index data of said media in a predetermined manner.

4. The information acquiring apparatus according to claim 1, wherein the website provides a service so that a user can directly purchase another media or goods relating to the media via the website.

5. An information acquiring method comprising the steps of:
providing a database, having updatable content containing information relating to a media, searchable by key data generated as a function of information stored at a predetermined place of said media, said content including an address of a server relating to the media;
reading the key data from the media;
accessing, through the Internet, the server based on the address of the server retrieved from the database, wherein the database is retrieved based on the key data;
obtaining from the server, through the Internet, an address of a website relating to the media, said website address being different than said server address;
inquiring of a user whether to execute accessing the website;
accessing, through the Internet, the website at the address obtained from the server based on a result of the inquiry;

updating said content of the database at any time through the Internet by connecting said database to said address of the website obtained from the server; and selecting a location of another database having said updatable content searchable by said key data, said another database being different from said database, wherein said another database is retrieved based on the key data.

6. The information acquiring method according to claim 5, further comprising the step of inquiring a user whether the access to the server is acceptable before connecting the server.

7. The information acquiring method according to claim 5, wherein said key data is generated by calculating a portion of index data of said media in a predetermined manner.

8. The information acquiring method according to claim 5, wherein the website provides a service so that a user can directly purchase another media or goods relating to the media via the website.

9. A computer memory storing a program to be executed in a computer, the program comprising instructions for updating content of a database, said content containing information relating to a media, searchable by key data generated as a function of information stored at a predetermined place of said media, said content including an address of a server relating to the media, said instructions being executable for performing the steps of:

reading the key data from the media;

accessing, through the Internet, the server based on the address of the server retrieved from the database, wherein the database is retrieved based on the key data;

obtaining from the server, through the Internet, an address of a website relating to the media, said website address being different than said server address;

inquiring of a user whether to execute accessing the website;

accessing, through the Internet, the website at the address obtained from the server based on a result of the inquiry;

updating said content of the database at any time through the Internet by connecting said database to said address of the website obtained from the server; and selecting a location of another database having said updatable content searchable by said key data, said another database being different from said database, wherein said another database is retrieved based on the key data.

10. The computer readable medium according to claim 9, further comprising the step of inquiring a user whether the access to the server is acceptable before connecting the server.

11. The computer readable medium according to claim 9, wherein said key data is generated by calculating a portion of index data of said media in a predetermined manner.

12. The computer readable medium according to claim 9, wherein the website provides a service so that a user can directly purchase another media or goods relating to the media via the website.

* * * * *